United States Patent [19]
Kaneda et al.

[11] Patent Number: 5,375,024
[45] Date of Patent: Dec. 20, 1994

[54] TAPE CASSETTE

[75] Inventors: Hiroshi Kaneda; Masatoshi Okamura, both of Saku; Kimitoshi Itoh, Hita, all of Japan

[73] Assignee: TDK Corporation, Tokyo, Japan

[21] Appl. No.: 70,969

[22] Filed: Jun. 4, 1993

[30] Foreign Application Priority Data
Jun. 4, 1992 [JP] Japan ............................ 4-44387[U]

[51] Int. Cl.⁵ .......................... G11B 23/02; G03B 1/04
[52] U.S. Cl. .................................. 242/347.1; 360/132
[58] Field of Search ................. 360/132; 242/199, 200

[56] References Cited
U.S. PATENT DOCUMENTS
4,180,220  12/1979  Shiba et al. .
4,564,120  1/1986   Pertzsch et al. .................... 242/199
4,771,352  9/1988   Watanabe et al. ................... 242/199
4,783,022  11/1988  Onmori et al. ...................... 242/199

FOREIGN PATENT DOCUMENTS
0147513    7/1985   European Pat. Off. .
57-28310   6/1982   Japan .
63-63986   12/1988  Japan .

*Primary Examiner*—John H. Wolff
*Assistant Examiner*—Allen Cao
*Attorney, Agent, or Firm*—Oblon, Spivak, McClelland, Maier, & Neustadt

[57] ABSTRACT

A tape cassette which includes a case composed of an upper case and a lower case in which a couple of tape reels wound with a tape are rotably provided and which is provided with an opening and closing lid being rotatable around supporting axes and covering an opening portion of the case for drawing out tape at a front face of the case, said opening and closing lid being urged in a closing direction thereof by a spring, wherein a spring receiving groove for inserting an end of the spring is provided in one of the supporting axes and at least one edge portion at an innermost portion of the spring receiving groove is formed in a curved face.

1 Claim, 4 Drawing Sheets

TAPE CASSETTE

BACKGROUND OF THE INVENTION

1. Field of the Invention

This invention relates to a tape cassette such as a video tape cassette.

2. Discussion of Background

In a conventional video tape cassette, a magnetic tape is wound around tape reels having flanges on their top and bottom sides which are accommodated in a reel accommodating area, an opening and closing lid is provided at the front face of a case, the opening and closing lid is opened when the video tape cassette is charged into a video device and the magnetic tape is drawn out on the side of a head thereof.

Further, as shown in FIG. 7, in a spring retaining mechanism of the conventional opening and closing lid, a spring receiving groove "c" is formed in a supporting pin or axis "b" protruded on an opening and closing lid "a", and the shape of an edge portion at the innermost portion of the spring receiving groove "c" is rectangular. Accordingly, the supporting axis "b" is thin-walled, and, therefore, the strength thereof is low. A crack or a bending and/or cut-off accident is liable to be caused by the pressure at the spring end owing to the operation of the opening and closing lid or impact by dropping thereof, which is problematic in view of the reliability.

SUMMARY OF THE INVENTION

It is an object of the present invention to avoid these conventional drawbacks and to provide a tape cassette having high durability, wherein the opening and closing function of the opening and closing lid can precisely and safely be achieved, the strength of the supporting axes of the opening and closing lid is enhanced, the reliability against the dropping of case or other impacts is promoted and the yield thereof can be promoted without manufacturing inferior products having cracks in forming steps thereof.

According to an aspect of the present invention, there is provided a tape cassette which includes a case composed of an upper case and a lower case in which a couple of tape reels wound with a tape are rotably provided and which is provided with an opening and closing lid being rotatable around supporting axes and covering an opening portion of said case for drawing out said tape at a front face of the case, said opening and closing lid being urged in a closing direction thereof by a spring, wherein a spring receiving groove for inserting an end of said spring is provided in one of said supporting axes and at least one edge portion at an innermost portion of the spring receiving groove is formed in a curved face.

In preserving the case, an opening and closing lid 5 is closed by being urged by a spring 10, which is locked by a stopping element 6, and the magnetic tape is safely protected in the case. When the cassette case is charged into a device, a lock piece releasing unit on the side of the device pushes in the stopping element 6. When the disengaging pin is released from the opening and closing lid 5, the opening and closing lid 5 is opened and the magnetic tape is exposed and can be employed. (refer to FIG. 1) Further, an end of the spring 10 is inserted and retained into a spring receiving groove 8 which is formed in a supporting axis 7 of the opening and closing lid 5, which urges the opening and closing lid 5 in the closing direction. The strength of the supporting axes is enhanced since this spring receiving groove 8 provides sufficient wall thickness at a curved face 9 of the innermost corner of the supporting axis. The reliability against the dropping thereof is promoted, the yield thereof is enhanced by dispensing with the inferior products having cracks in the forming steps and the opening and closing operation of the lid can be kept in a safe and good state.

DETAILED DESCRIPTION OF THE PREFERRED EMBODIMENTS

Figure 1:
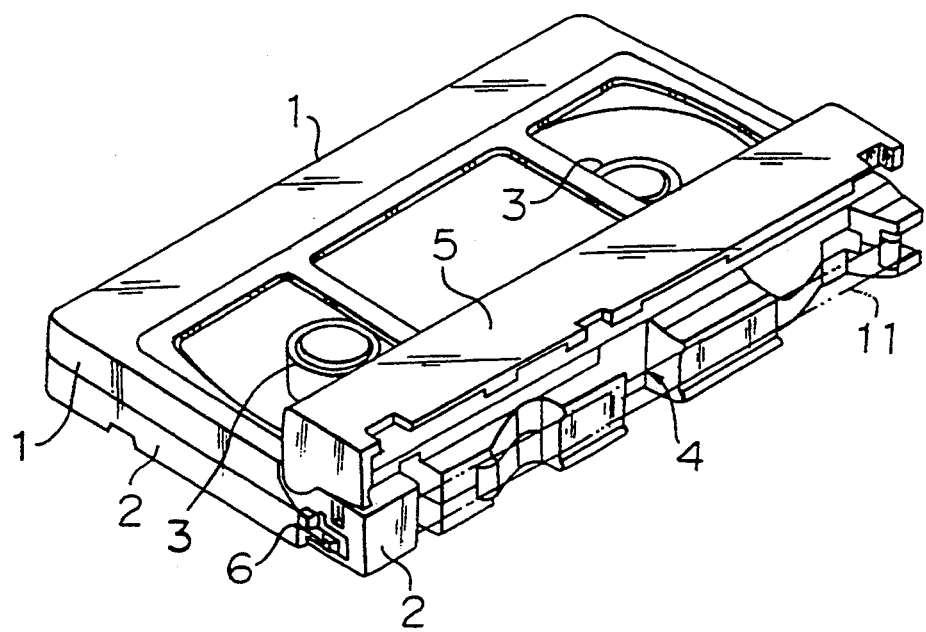
FIG. 1 is a perspective view of a magnetic tape cassette of an embodiment of this invention showing an opening state of an opening and closing lid.
Figure 2:
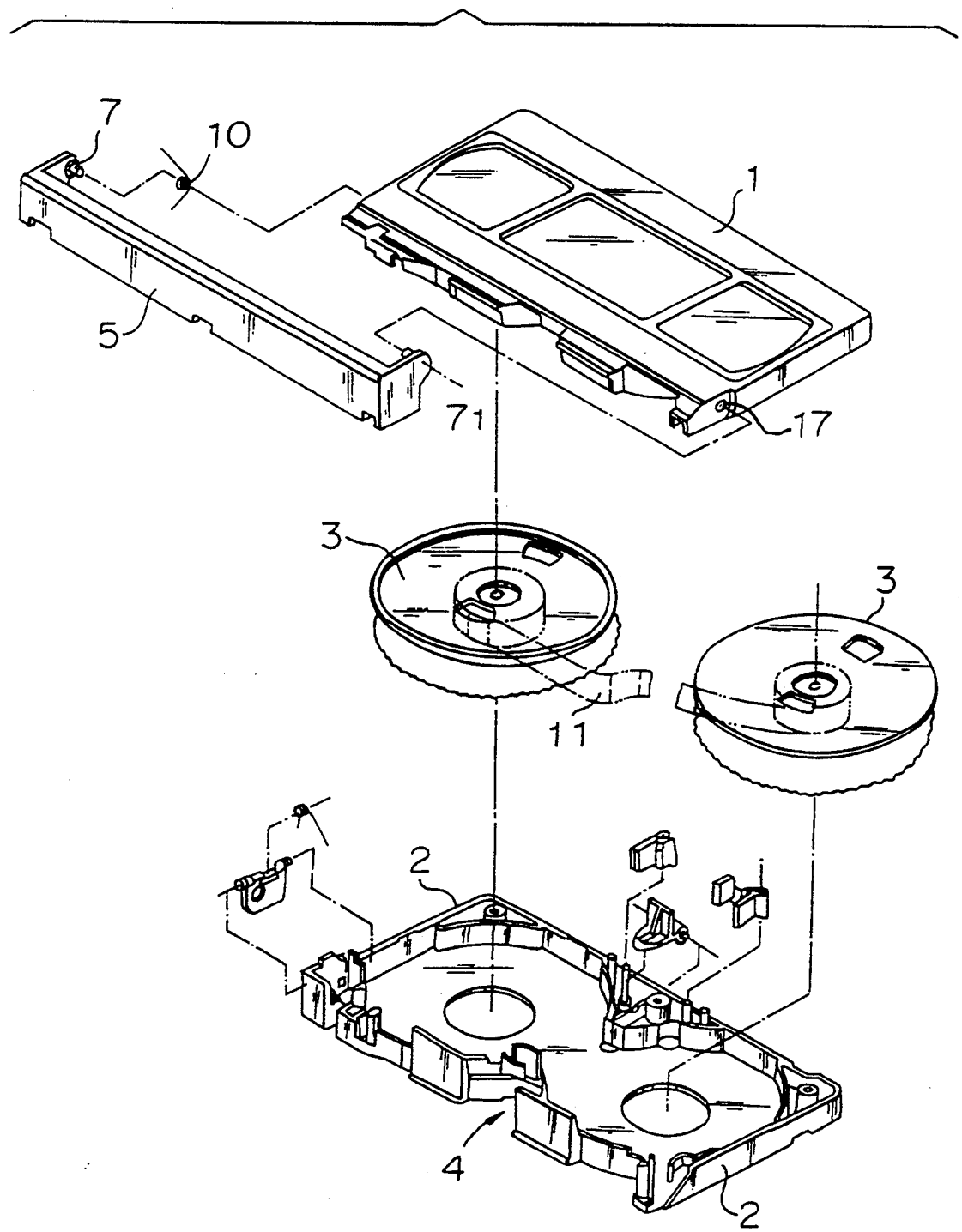
FIG. 2 is a perspective view of the example of FIG. 1 in its exploded state.
Figure 3:
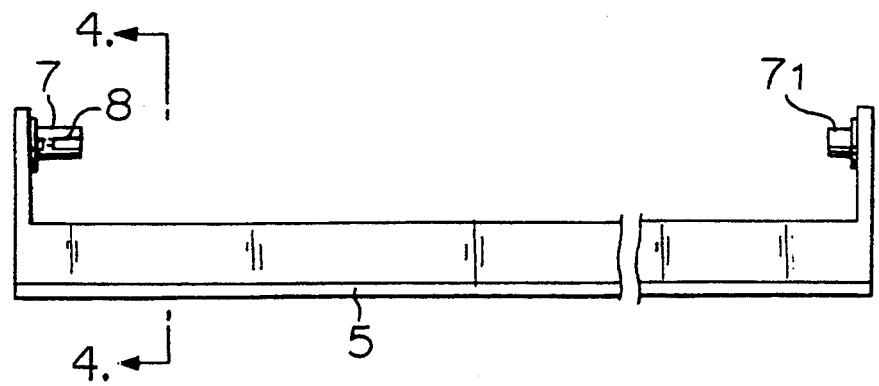
FIG. 3 is a plan view of the opening and closing lid.
Figure 4:
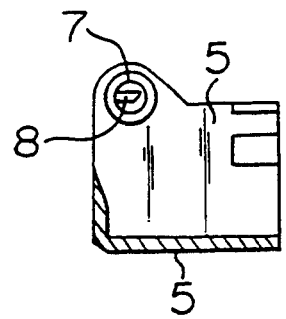
FIG. 4 is a partially sectional longitudinal diagram taken along a line A—A of FIG. 3.
Figure 5:
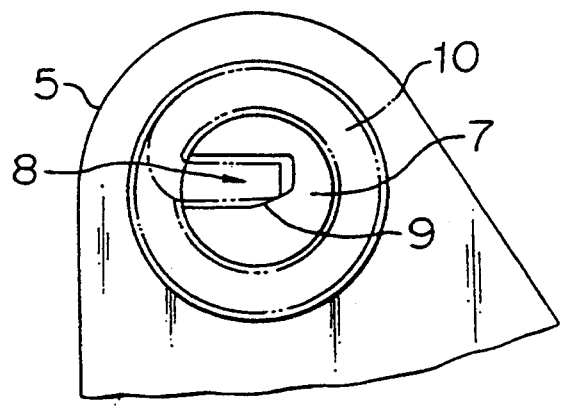
FIG. 5 is a magnified side view of an important portion of FIG. 4.

An explanation will be given of an embodiment of the present invention in reference to FIGS. 1 through 5. A tape cassette is constructed as follows. A couple of tape reels 3 which are wound with a tape 11, are rotatably accommodated in a case composed of an upper case 1 and a lower case 2. An opening and closing lid 5 covering an opening 4 for drawing out the tape 11, is provided at a front face of the case, which is rotatable around a supporting pin or axis 7. The opening and closing lid 5 is urged in the closing direction by a spring 10. The pin or axis 7 is formed as a substantially cylindrical shaft. A spring receiving groove 8 is provided in the supporting axis 7 for inserting an end of the spring. The groove 8 does not extend radially through the entire diameter of the pin and so has an inner end. At least one edge at the inner end of the spring receiving groove 8 is formed into a curved face 9 curved about an axis substantially parallel to the axis of the cylindrical surface of the pin.

The opening and closing lid 5 is protruded with a supporting axis $7_1$ on a side wall opposing the supporting axis 7 protruded on an inner face of the other side wall, which is integrated by inserting the supporting axis $7_1$ into an axis hole 17 formed on the upper case 1, which is urged in the closed direction by the spring 10 engaged with the supporting axis 7.

Further, in forming the edge at the innermost portion of the spring receiving groove 8 into the curved face 9, either one of the corner portions may be formed into the curved face. The edge corresponding with the winding direction of the spring 10 is formed into the curved face 9. The spring coil portion is fitted to the supporting axis 7 and the end of spring is inserted into the spring receiving groove 8.

Figure 6:
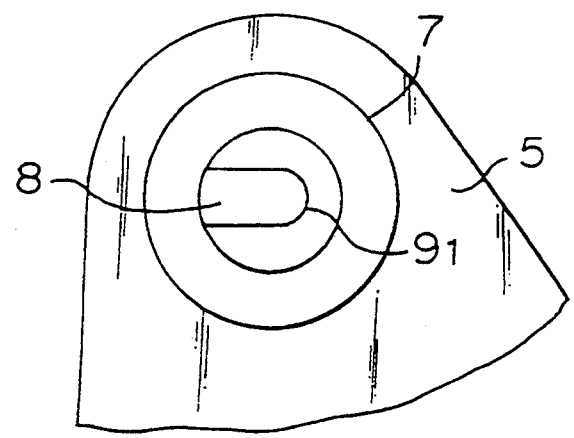
FIG. 6 is a magnified side view of an important part of an embodiment of this invention.
Figure 7:
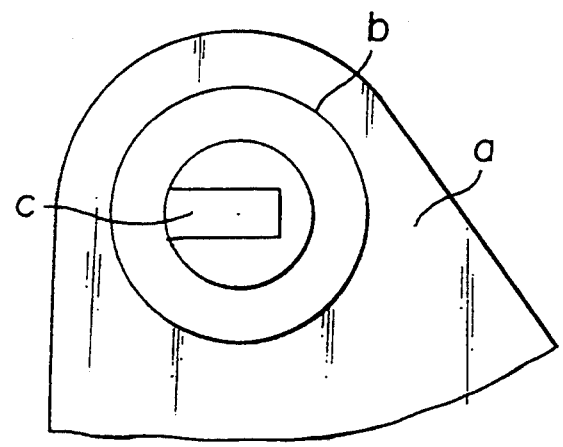
FIG. 7 is a magnified side view of a supporting axis of an opening and closing lid of a conventional example.

In an embodiment of FIG. 6, both corners at the innermost portion of the spring receiving groove 8 are formed into a semi-circular face $9_1$ having sufficient wall thickness, which enhances the durability against the impact by dropping.

Table 1 shows experimental data showing a relationship between a forming cycle and crack generation.

TABLE 1

| Forming cycle | | 12.0 sec | 11.5 sec | 11.0 sec | 10.5 sec |
| --- | --- | --- | --- | --- | --- |
| Crack generation | Conventional Example (square corner) | ○ | X | — | — |
| | Invention Example (rounded corner) | ○ | ○ | ○ | ○ |

○: no crack
X: crack

At the forming cycle of 12.0 sec., both in the conventional and invented cases, no crack was caused. At the forming cycle of 11.5 sec., crack was caused in the conventional example and no crack was caused in the invented case. No crack was caused up to the forming cycle of 10.5, in the invented case. The reason why crack is less caused in the invented case than in the conventional case, is that the rounded corner in the invented case contributes to the mold removing performance.

Table 2 shows experimental results of the strength of the tape cassette. As shown in Table 2, in the conventional example, according to the drop test, cracks were generated in one out of twenty test pieces, whereas no cracks were generated in twenty test pieces of this invention. As shown in Table 2, the torsional strength of the invented test cassette is increased as compared with the test result of the conventional example.

TABLE 2

| | Drop test (from the height) of 75 cm | Torsional strength test |
| --- | --- | --- |
| Conventional Example (square corner) | 1/20 crack generation | 1.5 kg · cm |
| Invention Example (rounded corner) | 0/20 | 3.0 kg · cm |

According to the present invention, in the tape cassette which includes the case composed of the upper case and the lower case, which rotatably accommodates the couple of tape reels wound by a tape, and which is provided with the opening and closing lid covering the opening for drawing out the tape at the front face of the case, which is rotatable around the supporting axes, wherein the opening and closing lid is urged in the closing direction by the spring, the spring receiving groove is provided which inserts an end of the spring into the supporting axis and at least one edge at the innermost portion of the spring receiving groove is formed into a curved face. Accordingly, when the supporting axis of the opening and closing lid is utilized as a portion for retaining the spring, the strength thereof is enhanced irrespective of the spring receiving groove formed at the supporting axis, by providing a sufficient thickness at the corner of the innermost portion of the spring receiving groove. Accordingly, this invention provides a tape cassette having high durability wherein the reliability against the dropping of case or other impacts is promoted and the yield thereof is promoted without manufacturing the inferior products having cracks in the forming steps.

What is claimed is:

1. A tape cassette, comprising:
   a case defining an opening portion;
   two reels in said case, said reels supporting a tape movable past said opening portion so that said tape may be drawn out;
   a lid pivotally mounted to said case so as to selectively open and close said opening portion, said lid including two aligned pins at opposite ends of said lid and defining a supporting axis for pivotal movement of said lid, one of said pins comprising:
   a) a substantially cylindrical shaft extending from said lid, and
   b) a groove extending inward in a substantially radial direction from the cylindrical surface of said shaft, said groove terminating at an inner end within said shaft, wherein said groove does not extend radially through an entire diameter of said shaft, said inner end having at least one semi-circular curved face curved about an axis substantially parallel to the axis of the cylindrical surface;
   and a spring having an end fitted in said groove, and thereby enhance durability.

* * * * *